United States Patent
Fuhry et al.

(10) Patent No.: US 7,858,162 B2
(45) Date of Patent: Dec. 28, 2010

(54) FOOD CANS COATED WITH A COMPOSITION COMPRISING AN ACRYLIC POLYMER

(75) Inventors: Mary Ann M. Fuhry, Butler, PA (US); John M. Dudik, Apollo, PA (US); Ronald R. Ambrose, Pittsburgh, PA (US); Kenneth W. Niederst, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1104 days.

(21) Appl. No.: 11/399,227

(22) Filed: Apr. 6, 2006

(65) Prior Publication Data

US 2007/0235108 A1 Oct. 11, 2007

(51) Int. Cl.
*B32B 15/08* (2006.01)
*B65D 75/00* (2006.01)

(52) U.S. Cl. ............... 428/35.8; 428/34.1; 428/35.7; 428/36.6; 206/139

(58) Field of Classification Search ............ 428/34.1, 428/35.7, 35.8, 36.6; 206/139
See application file for complete search history.

(56) References Cited

U.S. PATENT DOCUMENTS

| | | | | |
|---|---|---|---|---|
| 3,532,655 A | 10/1970 | Radlove et al. | ............ | 260/28.5 |
| 4,289,671 A | 9/1981 | Hernandez | ................. | 260/28.5 |
| 4,487,860 A * | 12/1984 | Winner et al. | ............... | 523/408 |
| 4,705,703 A | 11/1987 | Meier et al. | ................. | 427/239 |
| 4,937,114 A | 6/1990 | Wasson et al. | ............. | 428/35.8 |
| 5,030,683 A * | 7/1991 | Nakamura | ................... | 524/512 |
| 5,639,514 A * | 6/1997 | Jones et al. | .................. | 427/318 |
| 5,868,872 A | 2/1999 | Karmaschek et al. | ....... | 148/247 |
| 6,235,102 B1 | 5/2001 | Parekh et al. | ........... | 106/287.22 |
| 6,461,688 B1 | 10/2002 | Seibel et al. | ................ | 427/487 |
| 6,777,524 B1 * | 8/2004 | Shimizu et al. | ............... | 528/76 |
| 2004/0259989 A1 | 12/2004 | O'Brien et al. | ............ | 524/236 |

FOREIGN PATENT DOCUMENTS

| | | |
|---|---|---|
| EP | 256391 | 7/1987 |
| JP | 52030426 A | 3/1977 |
| JP | 3006400 B | 1/1991 |
| JP | 1995278487 A | 10/1995 |
| JP | 2003147263 A | 5/2003 |
| WO | 00/66670 | 11/2000 |
| WO | 01/18133 | 3/2001 |
| WO | 2007/019144 | 2/2007 |

* cited by examiner

*Primary Examiner*—David R Sample
*Assistant Examiner*—Walter B Aughenbaugh
(74) *Attorney, Agent, or Firm*—Diane R. Meyers

(57) ABSTRACT

Food cans coated at least in part on the interior with a composition comprising an acrylic polymer and a crosslinker are disclosed. The composition is substantially epoxy-free and substantially polyester-free. The acrylic polymer has a weight average molecular weight of greater than or equal to 41,000 and an acid value of <30 mg KOH/g. Food cans coated at lease in part on the interior with a composition having a tensile strength of greater than 11 MPa are also disclosed.

18 Claims, No Drawings

FOOD CANS COATED WITH A COMPOSITION COMPRISING AN ACRYLIC POLYMER

FIELD OF THE INVENTION

The present invention relates to coated food cans, wherein the coating composition used to coat the cans comprises an acrylic polymer and a crosslinker.

BACKGROUND OF THE INVENTION

The application of various treatment and pretreatment solutions to metals to retard or inhibit corrosion is well established. This is particularly true in the area of metal food and beverage cans. Coatings are applied to the interior of such containers to prevent the contents from contacting the metal of the container. Contact between the metal and the food or beverage can lead to corrosion of the metal container, which can then contaminate the food or beverage. This is particularly true when the contents of the can are acidic in nature, such as tomato-based products and soft drinks. The coatings applied to the interior of food and beverage cans also helps prevent corrosion in the head space of the cans, which is the area between the fill line of the food product and the can lid; corrosion in the head space is particularly problematic with food products having a high salt content.

In addition to corrosion protection, coatings for food and beverage cans should be non-toxic, and should not adversely affect the taste of the food or beverage in the can. Resistance to "popping", "blushing" and/or "blistering" is also desired.

Certain coatings are particularly applicable for application onto coiled metal stock, such as the coiled metal stock from which the ends of cans are made, "can end stock". Since coatings designed for use on can end stock are applied prior to the ends being cut and stamped out of the coiled metal stock, they are also typically flexible and extensible. For example, can end stock is typically coated on both sides. Thereafter, the coated metal stock is punched, scored for the "pop-top" opening and the pop-top ring is then attached with a pin that is separately fabricated. The end is then attached to the can body by an edge rolling process. Accordingly, the coating applied to the can end stock typically has a minimum degree of toughness and flexibility, such that it can withstand extensive fabrication processes, in addition to the other desirable features discussed above.

Various epoxy-based coatings and polyvinyl chloride-based coatings have been used in the past to coat the interior of metal cans to prevent corrosion. The recycling of materials containing polyvinyl chloride or related halide-containing vinyl polymers can generate toxic by-products, however; moreover, these polymers are typically formulated with epoxy-functional plasticizers. In addition, epoxy-based coatings are prepared from monomers such as bisphenol A ("BPA") and bisphenol A diglycidylether ("BADGE"), which is being reported as having negative health effects. While attempts have been made to scavenge the residual unreacted epoxy with, for example, acid functional polymers, this does not adequately address the problem; some free BADGE or its by-products will still remain. Government authorities, particularly in Europe, are restrictive on the amount of free BPA, BADGE and/or their by-products that are acceptable. Thus, there is a need for food and beverage can liners that are substantially free from BPA, BADGE, epoxy and halogenated vinyl products.

SUMMARY OF THE INVENTION

The present invention is directed to food cans coated at least in part on the interior with a composition comprising:
 a) greater than 7 wt % based on total solids weight of an acrylic polymer having a weight average molecular weight of $\geq 41,000$ and an acid value of <30 mg KOH/g; and
 b) a crosslinker.

wherein the composition is substantially epoxy-free and substantially polyester-free.

The present invention is further directed to a food can coated at least in part on the interior with a composition having a tensile strength of greater than 11 MPa, as measured by an Instron apparatus.

DETAILED DESCRIPTION OF THE INVENTION

The present invention is directed to food cans coated at least in part on the interior with composition comprising an acrylic polymer and a crosslinker. The term "food can(s)" is used herein to refer to cans, containers or any type of metal receptacle or portion thereof used to hold any type of food or beverage. For example, the term "food can(s)" specifically includes "can ends", which are typically stamped from can end stock and used in conjunction with the packaging of beverages.

The compositions are substantially epoxy-free. "Substantially epoxy-free" means that the compositions are substantially free from oxirane rings or residues of oxirane rings; bisphenol A; BADGE or adducts of BADGE; glycidyl groups or residues of glycidyl groups; polyvinylchloride and/or related halide-containing vinyl polymers. It will be understood that trace or minor amounts of one or more of these components can be present, such as 10 wt % or less, 5 wt % or less, 2 or even 1 wt % or less, with wt % based on total solids weight, and still be "substantially epoxy-free". The compositions are also substantially polyester-free. "Substantially polyester-free" means that the composition is substantially free from polyester; that is, the composition contains polyester in amounts less than those that would allow the polyester to contribute to the film forming and performance properties of the coating. It will therefore be understood that trace or minor amounts of polyester can be present, such as 10 wt % or less, 5 wt % or less, 2 or even 1 wt % or less, with wt % based on total solids weight, and still be "substantially polyester-free".

The acrylic polymer used according to the present invention can be, for example, an acrylic homopolymer or copolymer. Various acrylic monomers can be combined to prepare the acrylic polymer used in the present invention. Examples include methyl(meth)acrylate, ethyl(meth)acrylate, butyl (meth)acrylate, hydroxy alkyl(meth)acrylate, 2-ethylhexyl (meth)acrylate, behenyl(meth)acrylate, lauryl(meth)acrylate, allyl(meth)acrylate isobornyl(meth)acrylate, ethylene glycol di(meth)acrylate, (meth)acrylic acid, vinyl aromatic compounds such as styrene and vinyl toluene, nitriles such as (meth)acrylonitrile, and vinyl ester such as vinyl acetate. Any other acrylic monomers known to those skilled in the art could also be used. The term "(meth)acrylate" and like terms are used conventionally and herein to refer to both methacrylate and acrylate. In certain embodiments, the acrylic polymer comprises components approved by the FDA for use with food cans, and/or listed on EINECS and in certain embodiments, the acrylic polymer comprises only components approved by the FDA for use with food cans, and/or listed on EINECS.

Typically, the weight average molecular weight ("Mw") of the acrylic polymer will be 41,000 or greater, such 60,000 or greater. It has been discovered that an acrylic having a Mw of 41,000 or greater forms films with desirable tensile strength with minimal crosslinking density. This is particularly relevant when coating can end stock and stamping can ends therefrom.

In certain embodiments, the acrylic polymer is not prepared with acrylamide-containing monomers.

In certain embodiments, the acrylic is copolymerized with a phosphate-functional monomer. Thus the acrylic polymer can be formed from acrylic monomers some of which have phosphate functionality; in certain embodiments, the acrylic polymer is made only with acrylic monomers, some of which have phosphate-functionality. Examples of phosphate-functional acrylic monomers that can be used to form phosphate-functional acrylic polymers include phosphoethyl(meth)acrylate, and phosphate functional (meth)acrylates, sold by Rhodia as SIPOMER PAM-100 and -200.

Certain embodiments of the present invention are directed to food cans coated at least in part on the interior with a composition consisting essentially of an acrylic polymer that is formed only from acrylic monomers, some of which optionally have phosphate functionality, and a crosslinker. In certain embodiments, the acrylic polymer is not a core-shell emulsion polymer, and in other embodiments, the acrylic polymer specifically excludes styrene and/or ethylene or components comprising ethylene including, for example, ethylene-maleic acid copolymers and/or polyethylene resin.

The compositions used according to the present invention further comprise a crosslinker. A suitable crosslinker can be determined based upon the needs and desires of the user, and can include, for example, aminoplast crosslinkers, phenolic crosslinkers and blocked isocyanates. Aminoplast crosslinkers can be melamine based, urea based, or benzoguanamine based. Melamine crosslinkers are widely commercially available, such as from Cytec Industries, Inc. as CYMEL 303, 1130, 325, 327, and 370. Phenolic crosslinkers include, for example, novolacs, resoles, and Bisphenol A. For use on food cans, phenolic resoles that are not derived from bisphenol A are particularly suitable.

The compositions used according to the present invention typically comprise greater than 7 wt % of an acrylic polymer, wherein wt % is based on the total solids weight of the composition. Typically, the acrylic polymer will be present in a range of 8 to 99 wt %, such as 80 to 99 wt %. The crosslinker is typically present in an amount of 1 to 30 wt %, such as 2 to 5 wt %, again with wt % being based on the total solids weight. In certain embodiments, the wt % of crosslinker in the composition is 10 wt % or less, based on total solids weight, such as 5 wt. % or less. It has been surprisingly discovered that use of an acrylic polymer having a relatively high Mw (i.e. 41,000 or greater) results in coatings that have better film properties as compared to coatings comprising acrylic polymers having lower molecular weights. Moreover, the higher molecular weight allows for use of a reduced amount of crosslinker as compared with other can coatings. This is significant, in that high amounts of crosslinker tend to make a coating more brittle; by "high amounts" is meant greater than 15%, such as greater than 25%. This was surprising because acrylic coatings have previously not been regarded as providing sufficient flexibility for food cans or portions thereof, such as can ends.

The compositions used according to the present invention may also comprise a solvent, Suitable solvents include water, esters, glycol ethers, glycols, ketones, aromatic and aliphatic hydrocarbons, alcohols and the like. Particularly suitable are xylenes, propyleneglycol monomethyl acetates, and dibasic ester such as dimethyl esters of adipic, glutaric and succinic acids, It will be understood that use of those solvents does not make the compositions polyester-containing since the solvents will be substantially driven off during the bake. Typically, the compositions are prepared so as to be between about 30 and 60 weight percent solids. Alternatively, the compositions can be aqueous, As used herein, "aqueous" means 50% or greater of the non-solid component of the coating is water. Thus it will be understood that the non-solid component of the compositions can comprise up to 50% solvent and still be "aqueous". The present compositions can be made aqueous by neutralization of the carboxylic acid function acrylic polymer with an amine, such as dimethylethanolamine, and then dispersing it into water under agitation.

The compositions of the present invention can also contain any other conventional additives such as pigments, colorants, waxes, lubricants, defoamers, wetting agents, plasticizers, fortifiers and catalysts. Any mineral or sulfonic acid catalyst can be used. Particularly suitable for food can applications are phosphoric acid and dodecyl benzene sulfonic acid.

The present invention is further directed to a food can coated at least in part on the inside with a composition having a tensile strength of greater than 11 MPa, as measured by an Instron Mini 44 Unit with a 50 N load cell at a crosshead speed of 10 mm/min using free films of approximately 25.4 mm in length, 12.7 mm in width, 0.3 mm in thickness, and a 1 inch gauge length. Compositions having such a tensile strength can be formed, for example, as described above. It has been discovered that coated can end stock with coatings having such tensile strength maintain their integrity during fabrication into finished products, and after fabrication the coated can ends maintain their resistance properties, as compared to coatings with lower tensile strength.

The coating compositions described above can be applied to a food can by any means known in the art such as roll coating, spraying, and/or electrocoating. It will be appreciated that for two-piece food cans, the coating will typically be sprayed after the can is made. For three-piece food cans, on the other hand, a coil or sheet will typically be roll coated with one or more of the present compositions first and then the can will be formed. The coating is applied to at least part of the interior of the can, but can also be applied to at least part of the exterior of the can. For can end stock, a coil or sheet will typically be roll coated with one of the present compositions; the coating is then cured and the ends are stamped out and fabricated into the finished product, i.e. can ends.

After application, the coating is then cured. Cure is affected by methods standard in the art. For coil coating, this is typically a short dwell time (i.e. 9 seconds to 2 minutes) at high heat (i.e. 485° F. peak metal temperature); for coated metal sheets cure is typically longer (i.e. 10 minutes) but at lower temperatures (i.e. 400° F. peak metal temperature). It will be appreciated, therefore, that the composition applied to the food can results in a cured coating upon reaction between the acrylic polymer and crosslinker. It is intended that the cured coating remain substantially on the can to perform a protective function; thus, the present compositions are not pretreatments or lubricants that are applied and then washed off or otherwise substantially removed during the coating steps. In certain embodiments, transition metals are specifically excluded in amounts that would contribute to corrosion control from the compositions used in the present invention.

Any materials used for the formation of food cans can be treated according to the present methods. Particularly suitable substrates include chrome treated aluminum, zirconium treated aluminum, tin-plated steel, tin-free steel, and black-plated steel.

In certain embodiments, the coatings of the present invention can be applied directly to the metal, without any pretreatment or adhesive aid being added to the metal first. In certain other embodiments, such as when making can ends, pre-treated aluminum may be desirable. In addition, no coatings need to be applied over top of the coatings used in the present methods. In certain embodiments, the coatings described herein are the last coating applied to the food can. In certain other embodiments, the food cans of the present invention do not have a polyester layer deposited thereon, such as over or under the layer described herein.

The compositions used according to the present invention perform as desired both in the areas of flexibility and acid resistance. Significantly, these results can be achieved with a substantially epoxy-free and substantially polyester-free composition. Thus, the present invention provides particularly desirable coated food cans that avoid performance and health issued raised by other can coatings.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "an" acrylic polymer, "a" crosslinker and "a" solvent, one or more of each of these and any other components can be used. As used herein, the term "polymer" refers to oligomers and both homopolymers and copolymers, and the prefix "poly" refers to two or more.

EXAMPLES

The following examples are intended to illustrate the invention and should not be construed as limiting the invention in any way.

Example 1

Acrylic polymer "A" was made as follows:

TABLE 1

| Ingredients | Parts by Weight |
|---|---|
| Charge #1 | |
| DOWANOL PM[1] | 24.0 |
| Charge #2 | |
| DOWANOL PM | 4.2 |
| LUPEROX 26[2] | 0.6 |
| Charge #3 | |
| Butyl Acrylate | 17.6 |
| 2-Hydroxypropyl Methacrylate | 16.5 |
| Methacrylic Acid | 1.5 |
| 2-Ethylhexyl Acrylate | 5.9 |
| Methyl Methacrylate | 17.4 |
| Charge #4 | |
| DOWANOL PM (rinse for #2) | 1.0 |

TABLE 1-continued

| Ingredients | Parts by Weight |
|---|---|
| Charge #5 | |
| DOWANOL PM (rinse for #3) | 7.7 |
| Charge #6 | |
| DOWANOL PM | 0.3 |
| LUPEROX 26 | 0.3 |
| Charge #7 | |
| DOWANOL PM (rinse for #6) | 1.2 |
| Charge #8 | |
| DOWANOL PM | 0.3 |
| LUPEROX 26 | 0.3 |
| Charge #9 | |
| DOWANOL PM (rinse for #9) | 1.2 |

[1]Propylene glycol monomethyl ether used as a solvent, from Dow Chemical.
[2]t-Butylperoxy-2-ethylhexanoate, from Arkema, Inc.

Charge #1 was added to a 2 liter, 4 necked flask equipped with a motor driven stainless steel stir blade, water-cooled condenser and a heating mantle with a thermometer connected through a temperature feedback control device. The contents of the flask were heated to reflux (119° C.). Addition of Charge #2 and Charge #3 through two separate addition funnels (over 180 minutes) began. During the feeds, the reflux temperature gradually rose to 123° C. After the additions were complete, the two addition funnels were rinsed with Charge #4 and 5, respectively, and then the reaction was held at 123° C. for thirty minutes. Charge #6 was added through an addition funnel; the addition funnel was rinsed with Charge #7 and the mixture was held at 123° C. for an hour. Charge #8 was added through an addition funnel; the addition funnel was rinsed with Charge #9 and the mixture was held at 123° C. for an additional hour. (Polymer $M_w$=24,744)

Example 2

Acrylic polymer "B" was made as follows:

TABLE 2

| Ingredients | Parts by Weight |
|---|---|
| Charge #1 | |
| DOWANOL PM | 6.2 |
| Charge #2 | |
| DOWANOL PM | 3.6 |
| LUPEROX 26 | 0.6 |
| Charge #3 | |
| Butyl Acrylate | 17.6 |
| 2-Hydroxypropyl Methacrylate | 16.5 |
| Methacrylic Acid | 1.5 |
| 2-Ethylhexyl Acrylate | 5.9 |
| Methyl Methacrylate | 17.4 |
| Charge #4 | |
| DOWANOL PM (rinse for #3) | 2.9 |
| Charge #5 | |
| DOWANOL PM | 0.3 |
| LUPEROX 26 | 0.3 |
| Charge #6 | |
| DOWANOL PM (rinse for #5) | 3.5 |

TABLE 2-continued

| Ingredients | Parts by Weight |
|---|---|
| Charge #7 | |
| DOWANOL PM | 0.3 |
| LUPEROX 26 | 0.3 |
| Charge #8 | |
| DOWANOL PM (rinse for #7) | 0.9 |
| Charge #9 | |
| DOWANOL PM | 22.2 |

Charge #1 was added to a 3 liter, 4 necked flask equipped with a motor driven stainless steel stir blade, water-cooled condenser and a heating mantle with a thermometer connected through a temperature feedback control device. The contents of the flask were heated to reflux (120° C.). Addition of Charge #2 and Charge #3 through two separate addition funnels (over 180 minutes) began. During the feeds, the reflux temperature gradually rose to 134° C. After the additions were complete, the addition funnel that was used for Charge #3 was rinsed with Charge #4, and then the reaction was held at 134° C. for 30 minutes. Charge #5 was added through an addition funnel over 10 minutes; the addition funnel was rinsed with Charge #6 and the mixture was held at 130° C. for 60 minutes. Charge #7 was added through an addition funnel; the addition funnel was rinsed with Charge #8 and the mixture was held at 130° C. for an additional 60 minutes. The resin was cooled to 95° C. and thinned with Charge #9. (Polymer $M_w$=40,408)

Example 3

Acrylic polymer "C" was made as follows:

TABLE 3

| Ingredients | Parts by Weight |
|---|---|
| Charge #1 | |
| Toluene | 14.3 |
| Charge #2 | |
| Toluene | 3.7 |
| LUPEROX 575[3] | 0.4 |
| Charge #3 | |
| Butyl Acrylate | 15.6 |
| 2-Hydroxypropyl Methacrylate | 14.6 |
| Methacrylic Acid | 1.3 |
| 2-Ethylhexyl Acrylate | 5.2 |
| Methyl Methacrylate | 15.3 |
| Charge #4 | |
| Toluene (rinse for #3) | 3.3 |
| Charge #5 | |
| Toluene | 1.2 |
| Charge #6 | |
| Toluene (rinse for #2) | 0.8 |
| Charge #7 | |
| Toluene | 24.3 |

[3]t-Amylperoxy-2-ethylhexanoate, from Arkema, Inc.

Charge #1 was added to a 3 liter, 4 necked flask equipped with a motor driven stainless steel stir blade, water-cooled condenser and a heating mantle with a thermometer connected through a temperature feedback control device. The contents of the flask were heated to reflux (111° C.). Addition of 52% of Charge #2 through an addition funnel over 120 minutes began. Five minutes after the start of Charge #2, Charge #3 was added over 115 minutes. During the feeds, the reflux temperature gradually rose to 118° C. After the addition of Charge #3 was complete, the addition funnel that was used for Charge #3 was rinsed with Charge #4. The remainder of Charge #2 was added over 60 minutes. During the feed, Charge #5 was added to reduce resin viscosity and foam. When the feed was complete, the addition funnel was rinsed with Charge #6 and the temperature was reduced to 104° C. After holding at that temperature for 60 minutes, the resin was thinned with Charge #7. (Polymer $M_w$=75,255)

Example 4

Acrylic polymer "D" was made as follows:

TABLE 4

| Ingredients | Parts by Weight |
|---|---|
| Charge #1 | |
| Toluene | 12.6 |
| Charge #2 | |
| Toluene | 4.4 |
| LUPEROX 575 | 0.4 |
| Charge #3 | |
| Butyl Acrylate | 14.9 |
| 2-Hydroxypropyl Methacrylate | 13.9 |
| Methacrylic Acid | 1.2 |
| SIPOMER PAM-200[4] | 1.0 |
| 2-Ethylhexyl Acrylate | 5.0 |
| Methyl Methacrylate | 13.6 |
| Charge #4 | |
| DOWANOL PM | 1.2 |
| Charge #5 | |
| DOWANOL PM (rinse for #3) | 4.7 |
| Charge #6 | |
| DOWANOL PM (rinse for #2) | 0.9 |
| Charge #7 | |
| DOWANOL PM | 26.2 |

[4]Phosphate-functional monomer, from Rhodia.

Charge #1 was added to a 3 liter, 4 necked flask equipped with a motor driven stainless steel stir blade, water-cooled condenser and a heating mantle with a thermometer connected through a temperature feedback control device. The contents of the flask were heated to reflux (111° C.). Addition of 50% of Charge #2 through an addition funnel over 120 minutes began. Five minutes after the start of Charge #2, Charge #3 was added over 115 minutes. During the feeds, Charge #4 was added to reduce resin viscosity and foam; the reflux temperature gradually rose to 117° C. After the addition of Charge #3 was complete, the addition funnel that was used for Charge #3 was rinsed with Charge #5. The remainder of Charge #2 was added over 60 minutes. When the feed was complete, the addition funnel was rinsed with Charge #6 and the temperature was reduced to 104° C. After holding at that temperature for 60 minutes, the resin was thinned with Charge #7. (Polymer $M_w$=96,744)

Example 5

Acrylic polymer "E" was made as follows:

TABLE 5

| Ingredients | Parts by Weight |
|---|---|
| Charge #1 | |
| Toluene | 12.7 |
| Charge #2 | |
| Toluene | 4.9 |
| LUPEROX 575 | 0.4 |
| Charge #3 | |
| Butyl Acrylate | 14.9 |
| 2-Hydroxypropyl Methacrylate | 13.9 |
| Methacrylic Acid | 1.2 |
| SIPOMER PAM-200 | 1.0 |
| Isobornyl Methacrylate | 7.4 |
| 2-Ethylhexyl Acrylate | 5.0 |
| Methyl Methacrylate | 6.2 |
| Charge #4 | |
| DOWANOL PM (rinse for #3) | 4.7 |
| Charge #5 | |
| DOWANOL PM (rinse for #2) | 1.0 |
| Charge #6 | |
| DOWANOL PM | 26.7 |

Charge #1 was added to a 3 liter, 4 necked flask equipped with a motor driven stainless steel stir blade, water-cooled condenser and a heating mantle with a thermometer connected through a temperature feedback control device. The contents of the flask were heated to reflux (110° C.). Addition of 50% of Charge #2 through an addition funnel over 120 minutes began. Five minutes after the start of Charge #2, Charge #3 was added over 115 minutes. During the feeds, the reflux temperature gradually rose to 121° C. After the addition of Charge #3 was complete, the addition funnel that was used for Charge #3 was rinsed with Charge #4. The remainder of Charge #2 was added over 60 minutes. When the feed was complete, the addition funnel was rinsed with Charge #5 and the temperature was reduced to 104° C. After holding at that temperature for 60 minutes, the resin was thinned with Charge #6. (Polymer $M_w$=85,244)

Example 6

Acrylic polymer "F" was made as follows:

TABLE 6

| Ingredients | Parts by Weight |
|---|---|
| Charge #1 | |
| DOWANOL PM | 13.3 |
| Charge #2 | |
| DOWANOL PM | 4.7 |
| LUPEROX 575 | 0.4 |
| Charge #3 | |
| Butyl Acrylate | 15.6 |
| 2-Hydroxypropyl Methacrylate | 14.6 |
| Methacrylic Acid | 1.6 |
| SIPOMER PAM-200 | 1.0 |

TABLE 6-continued

| Ingredients | Parts by Weight |
|---|---|
| 2-Ethylhexyl Acrylate | 5.2 |
| Methyl Methacrylate | 14.1 |
| Charge #4 | |
| DOWANOL PM (rinse for #3) | 4.9 |
| Charge #5 | |
| DOWANOL PM (rinse for #2) | 1.0 |
| Charge #6 | |
| DOWANOL PM | 23.6 |

Charge #1 was added to a 2 liter, 4 necked flask equipped with a motor driven stainless steel stir blade, water-cooled condenser and a heating mantle with a thermometer connected through a temperature feedback control device. The contents of the flask were heated to reflux (119° C.). Addition of 50% of Charge #2 through an addition funnel over 120 minutes began. Five minutes after the start of Charge #2, Charge #3 was added over 115 minutes. During the feeds, the reflux temperature gradually rose to 126° C. After the addition of Charge #3 was complete, the addition funnel that was used for Charge #3 was rinsed with Charge #4. The remainder of Charge #2 was added over 60 minutes. When the feed was complete, the addition funnel was rinsed with Charge #5 and the temperature was reduced to 104° C. After holding at that temperature for 60 minutes, the resin was thinned with Charge #6. (Polymer $M_w$=63,526)

Acrylic polymer F was neutralized with dimethylethanolamine (80-120% neutralization) and dispersed into water.

Example 7

Five different samples were prepared by charging polymers A, B, C, D, and E, prepared as described in Examples 1, 2, 3, 4, and 5, respectively, into individual containers and mixing in the following ingredients in the order shown in Table 7 under ambient conditions until homogeneous.

TABLE 7

| Ingredient | Sample 1 | Sample 2 | Sample 3 | Sample 4 | Sample 5 |
|---|---|---|---|---|---|
| Polymer A | 55.4 parts | 0 | 0 | 0 | 0 |
| Polymer B | 0 | 54.9 parts | 0 | 0 | 0 |
| Polymer C | 0 | 0 | 61.7 parts | 0 | 0 |
| Polymer D | 0 | 0 | 0 | 65.1 parts | 0 |
| Polymer E | 0 | 0 | 0 | 0 | 64.1 parts |
| Aminoplast crosslinker[5] | 1.2 | 0 | 0 | 0 | 0 |
| Phenolic crosslinker[6] | 0 | 1.2 | 1.2 | 1.2 | 1.7 |
| NACURE 5925[7] | 0.7 | 0 | 0 | 0 | 0 |
| Phosphoric acid[8] | 0 | 5.1 | 5.1 | 5.1 | 5.1 |
| p-Toluene-sulfonic acid | 0 | 0.9 | 0.9 | 0.9 | 0.9 |
| Solvent[9] | 42.7 | 37.9 | 31.1 | 27.7 | 38.2 |

[5]CYMEL 1123, a benzoguanamine, from Cytec.
[6]METHYLON 75108 solution, from Durez Corporation.
[7]Blocked dodecylbenzylsufonic acid solution, from King Industries.
[8]Ortho phosphoric acid solution diluted to 10% by weight with isopropanol.
[9]1/1/1 ethyl acetate/Dowanol PM/dibasic ester.

Coatings were prepared by drawing Samples 1-5 over Cr-treated aluminum sheets with a 18 wire-wound rod. The coatings were baked for 10 seconds at 450° F. The coated sheets were evaluated for flexibility by bending and stamping wedges (2.0 inch by 4.5 inches). For wedge bends, the percent of coating that cracked or crazed along the bend was determined (100=crazed/no cure). The average flexibility was calculated from the results of three wedges. To measure surface cure, the coating was rubbed with methyl ethyl ketone (MEK=number of double rubs before the coating breaks through to the substrate). The resistance properties of the coated sheets were measured by processing (retorting) them in two food simulants for 30 minutes at 127° C. The two simulants were a 2% by weight solution of citric acid in deionized water and a 3% by weight solution of acetic acid in deionized water. Immediately upon removal from the retort solution, the coatings were evaluated for their ability to resist blushing using a visual scale of 0-4 with 0 being the best. For the adhesion test, the coatings were scored in a crosshatch pattern and covered with adhesive tape; the tape was pulled off and the percent of coating that remained intact was recorded (100=no pick-off). The tensile strength for Samples 3 and 4 were measured on an Instron apparatus using the free films as described in the specification above. All of the results are presented in Table 8.

TABLE 8

| Sample | Avg MEK | Flex | 2% Citric Acid Blush | Adh | 3% Acetic Acid Blush | Adh | Tensile (MPa) |
|---|---|---|---|---|---|---|---|
| 1 | 3 | 100 | 3 | 0 | 3 | 100 | NT |
| 2 | 10 | 100 | 1.5 | 100 | 1 | 100 | NT |
| 3 | 40 | 19 | 1.5 | 100 | 1 | 100 | 14 |
| 4 | 47 | 16 | 1 | 100 | 0.5 | 100 | 11 |
| 5 | 40 | 24 | 1 | 95 | 0 | 100 | NT |

*NT = not tested

As can be seen from Table 8, the coating used according to the present invention, Samples 3, 4, and 5, gave much better results overall as compared to Samples 1 and 2.

Whereas particular embodiments of this invention have been described above for purposes of illustration, it will be evident to those skilled in the art that numerous variations of the details of the present invention may be made without departing from the invention as defined in the appended claims.

Therefore we claim:

1. A food can coated at least in part on the interior with a composition comprising:
   (a) greater than 7 wt %, based on total solids weight, of an acrylic polymer having a weight average molecular weight of greater than or equal to 60,000 and an acid value of <30 mg KOH/g; and
   (b) a crosslinker,
wherein the composition is substantially epoxy-free and substantially polyester-free.

2. The food can of claim 1, wherein the wt % of acrylic polymer in the composition is 80 to 99 wt %, based on total solids weight.

3. The food can of claim 1, wherein the crosslinker is melamine.

4. The food can of claim 1, wherein the crosslinker is phenolic.

5. The food can of claim 4, wherein the wt % of crosslinker in the composition is less than 10 wt %, based on total solids weight.

6. The food can of claim 1, wherein the composition, when cured, is the last coating applied to the can.

7. The food can of claim 1, wherein the acrylic polymer comprises butyl acrylate, methyl methacrylate, 2-hydroxypropyl methacrylate, 2-ethylhexyl acrylate, methacrylic acid and/or phosphate functional (meth)acrylate.

8. A food can coated at least in part on the interior with a composition comprising an acrylic polymer, wherein the composition has a tensile strength of greater than 11 MPa, as measured by an Instron apparatus.

9. The food can of claim 8, wherein the composition comprises
   (a) greater than 7 wt %, based on total solids weight, of an acrylic polymer having a weight average molecular weight of greater than or equal to 60,000 and an acid value of <30 mg KOH/g; and
   (b) a crosslinker,
wherein the composition is substantially epoxy-free and substantially polyester-free.

10. The food can of claim 1, wherein the acrylic polymer has phosphate functionality.

11. The food can of claim 10, where the monomers used to form the acrylic polymer comprise phosphate functional (meth)acrylate.

12. The food can of claim 1, wherein the acrylic polymer is formed with only acrylic functional monomers.

13. The food can of claim 1, wherein the composition further comprises a solvent.

14. The food can of claim 1, wherein the acrylic polymer specifically excludes ethylene and components comprising ethylene.

15. The food can of claim 1, wherein the composition specifically excludes transition metals in amounts that would contribute to corrosion control.

16. A food can coated at least in part on the interior with a composition consisting essentially of:
   (a) an acrylic polymer having a weight average molecular weight of greater than or equal to 41,000 and an acid value of <30 mg KOH/g; and
   (b) a crosslinker,
wherein the acrylic polymer optionally comprises phosphate functionality.

17. The food can of claim 1, wherein the coated portion of the food can comprises a can end.

18. The food can of claim 1, wherein the acrylic polymer has a weight average molecular weight of greater than or equal to 75,000.

* * * * *